US009441409B2

(12) United States Patent
Smietana

(10) Patent No.: US 9,441,409 B2
(45) Date of Patent: Sep. 13, 2016

(54) WEAPON STORAGE ASSEMBLY

(71) Applicant: Scott Smietana, Hatfield, PA (US)

(72) Inventor: Scott Smietana, Hatfield, PA (US)

(*) Notice: Subject to any disclaimer, the term of this patent is extended or adjusted under 35 U.S.C. 154(b) by 36 days.

(21) Appl. No.: 14/453,218

(22) Filed: Aug. 6, 2014

(65) Prior Publication Data

US 2016/0040471 A1 Feb. 11, 2016

(51) Int. Cl.

*G08B 21/00* (2006.01)
*G05B 19/00* (2006.01)
*E05G 1/04* (2006.01)
*E05G 1/026* (2006.01)
*G07C 9/00* (2006.01)

(52) U.S. Cl.

CPC ................. *E05G 1/04* (2013.01); *E05G 1/026* (2013.01); *G07C 9/00674* (2013.01); *G07C 9/00817* (2013.01); *G07C 9/00912* (2013.01); *G07C 2009/00833* (2013.01)

(58) Field of Classification Search

CPC ........... E05G 1/00; E05G 1/04; E05G 1/024; E05G 1/026; E05G 1/10; G07C 9/00674; G07C 9/00817; G07C 9/00912; G07C 2009/00833; G08B 13/00; G08B 13/02; G08B 13/06; G08B 13/08

USPC ...................... 340/540, 541, 542, 545.1, 550

See application file for complete search history.

(56) References Cited

U.S. PATENT DOCUMENTS 4,309,065 A * 1/1982 Pappas ................. A47B 81/005 224/912
5,118,175 A * 6/1992 Costello .................... E05G 1/02 206/317
6,363,760 B1 * 4/2002 Sigmond ................... E05G 1/00 109/50
D498,895 S 11/2004 Lynch et al.
6,823,621 B2 11/2004 Gotfried
8,207,816 B2 6/2012 Crigger et al.
2006/0187610 A1 * 8/2006 Su ....................... F41H 13/0025 361/232
2007/0164848 A1 * 7/2007 Kim ........................ E05B 49/00 340/5.73
2011/0001407 A1 1/2011 Stradiota
2011/0046920 A1 2/2011 Amis
2011/0175730 A1 * 7/2011 Stevenson ............... E05B 47/00 340/540
2012/0267282 A1 * 10/2012 Holmes, Jr. ............... E05G 1/06 206/526
2013/0298807 A1 11/2013 Wall et al.
2013/0340656 A1 * 12/2013 Rainier ..................... E05G 1/02 109/38
2014/0173961 A1 * 6/2014 Goren ................... F41A 17/063 42/70.11

FOREIGN PATENT DOCUMENTS

CA 2552453 A1 1/2007

* cited by examiner

*Primary Examiner* — Brian Wilson

(57) ABSTRACT

A weapon storage assembly includes a housing that may be coupled to a vertical support surface. A door is movably coupled to the housing. A processor is coupled to the housing. A lock is coupled to the housing. The lock is operationally coupled to the processor. The lock engages the door so the door is retained in a closed position. A keypad is coupled to the housing. The keypad is operationally coupled to the processor. The user engages the keypad. The keypad unlocks the lock. A tazer is positioned within the housing. The user accesses the tazer after the door is opened. The tazer is used to subdue an assailant.

11 Claims, 5 Drawing Sheets

WEAPON STORAGE ASSEMBLY

BACKGROUND OF THE DISCLOSURE

Field of the Disclosure

The disclosure relates to storage devices and more particularly pertains to a new storage device for storing a weapon in a public area so the weapon is accessible to an authorized user.

SUMMARY OF THE DISCLOSURE

An embodiment of the disclosure meets the needs presented above by generally comprising a housing that may be coupled to a vertical support surface. A door is movably coupled to the housing. A processor is coupled to the housing. A lock is coupled to the housing. The lock is operationally coupled to the processor. The lock engages the door so the door is retained in a closed position. A keypad is coupled to the housing. The keypad is operationally coupled to the processor. The user engages the keypad. The keypad unlocks the lock. A tazer is positioned within the housing. The user accesses the tazer after the door is opened. The tazer is used to subdue an assailant.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
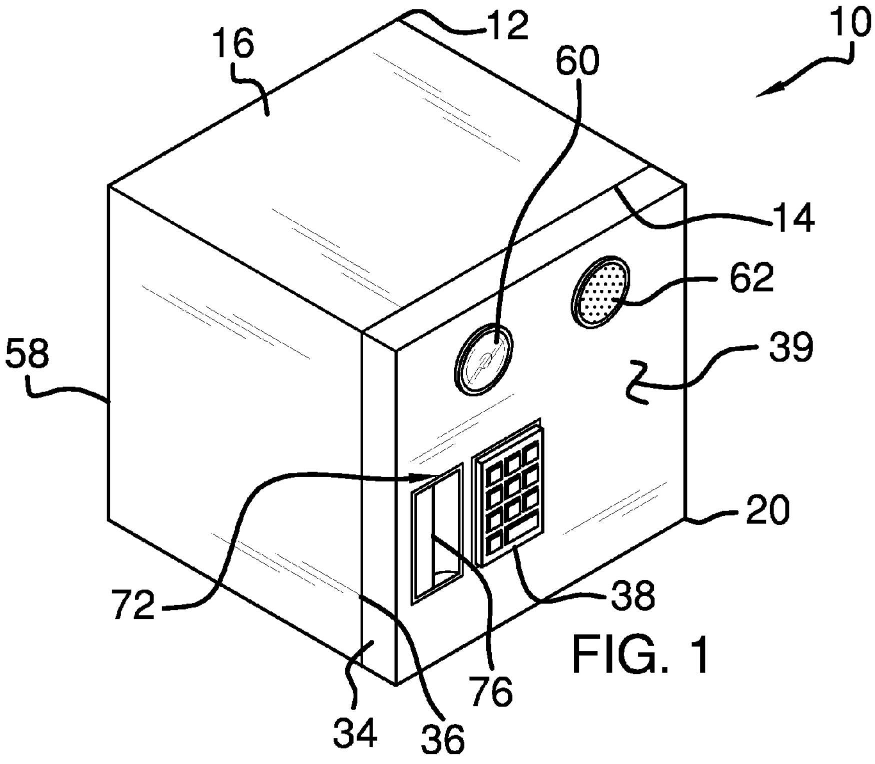
FIG. 1 is a perspective view of a weapon storage assembly according to an embodiment of the disclosure.
Figure 2:
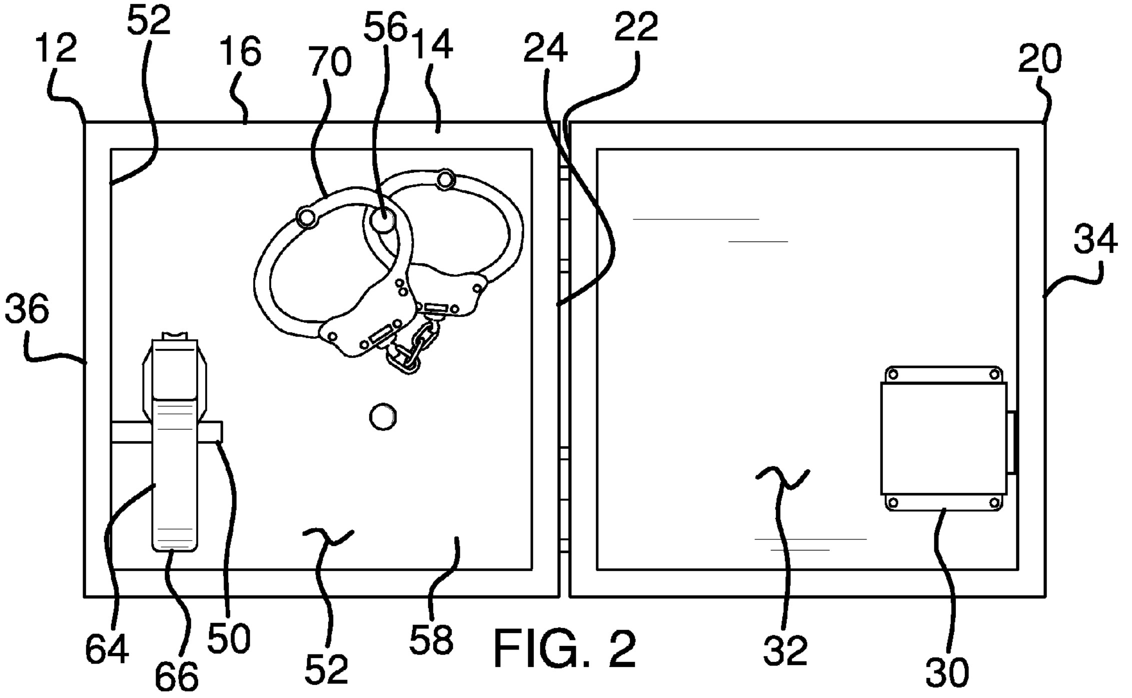
FIG. 2 is a front view of an embodiment of the disclosure in an open position.
Figure 3:
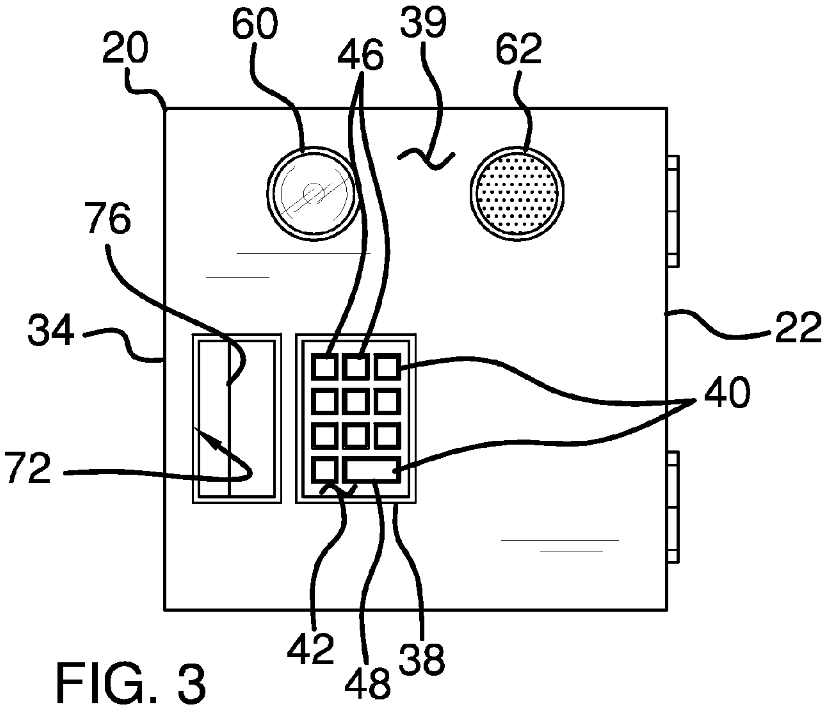
FIG. 3 is a front view of an embodiment of the disclosure in a closed position.
Figure 4:
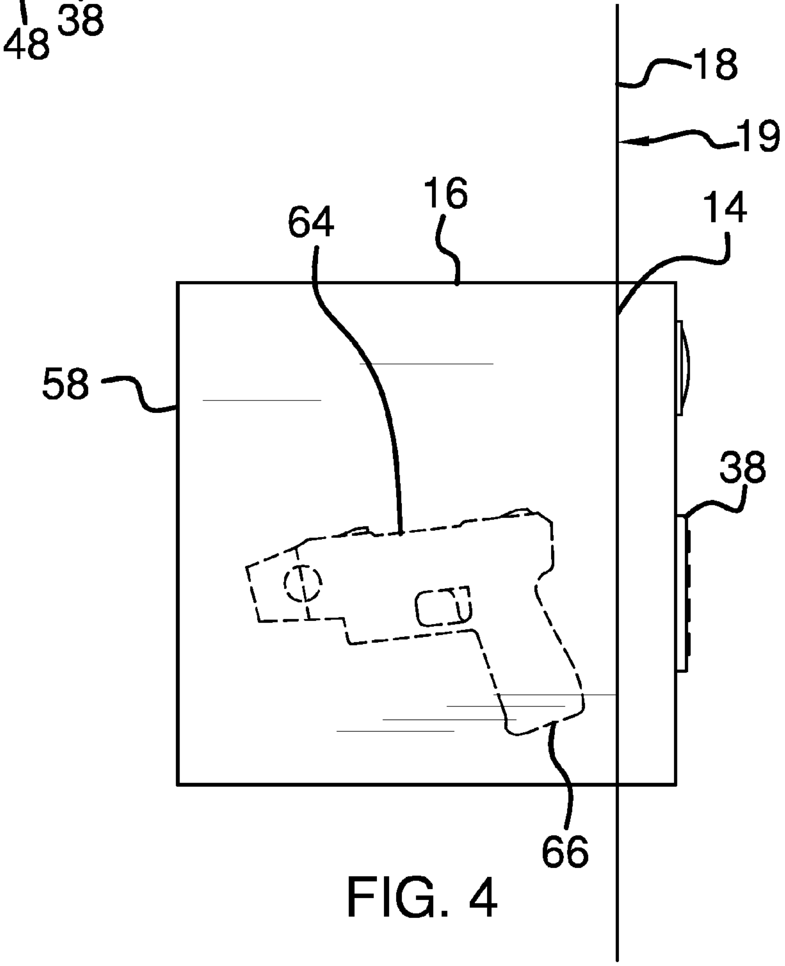
FIG. 4 is a right side view of an embodiment of the disclosure.
Figure 5:
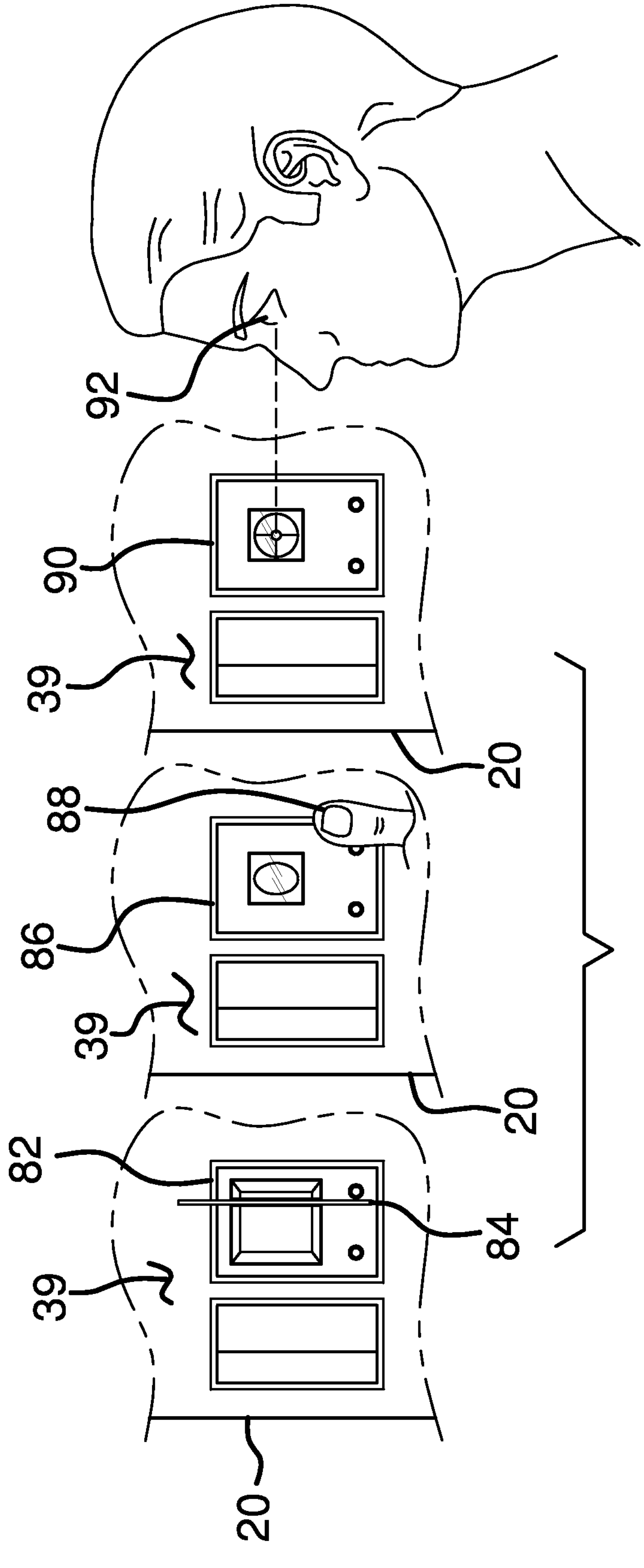
FIG. 5 is a detail view of an alternative embodiment of the disclosure.
Figure 6:
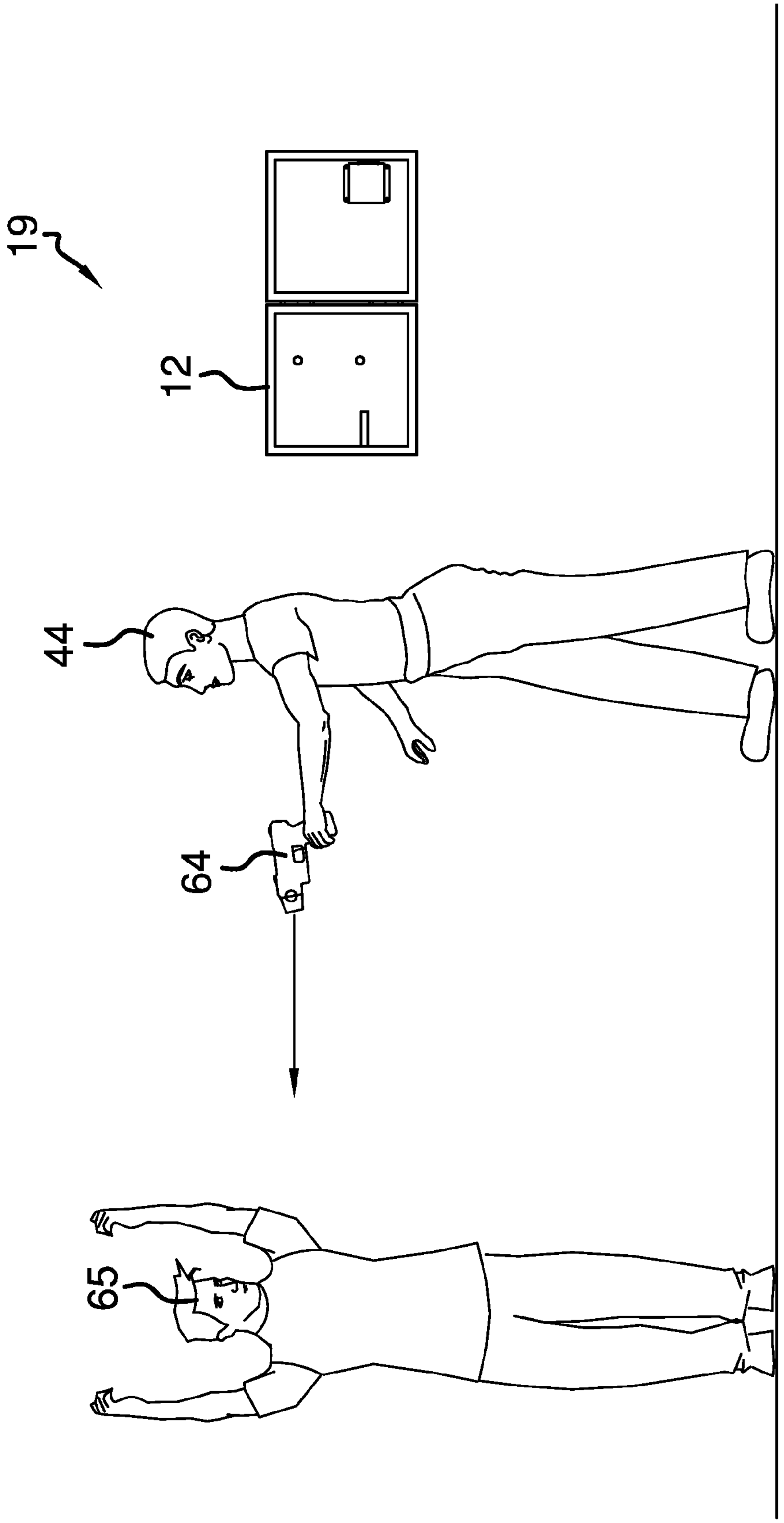
FIG. 6 is an in-use view of an embodiment of the disclosure.
Figure 7:
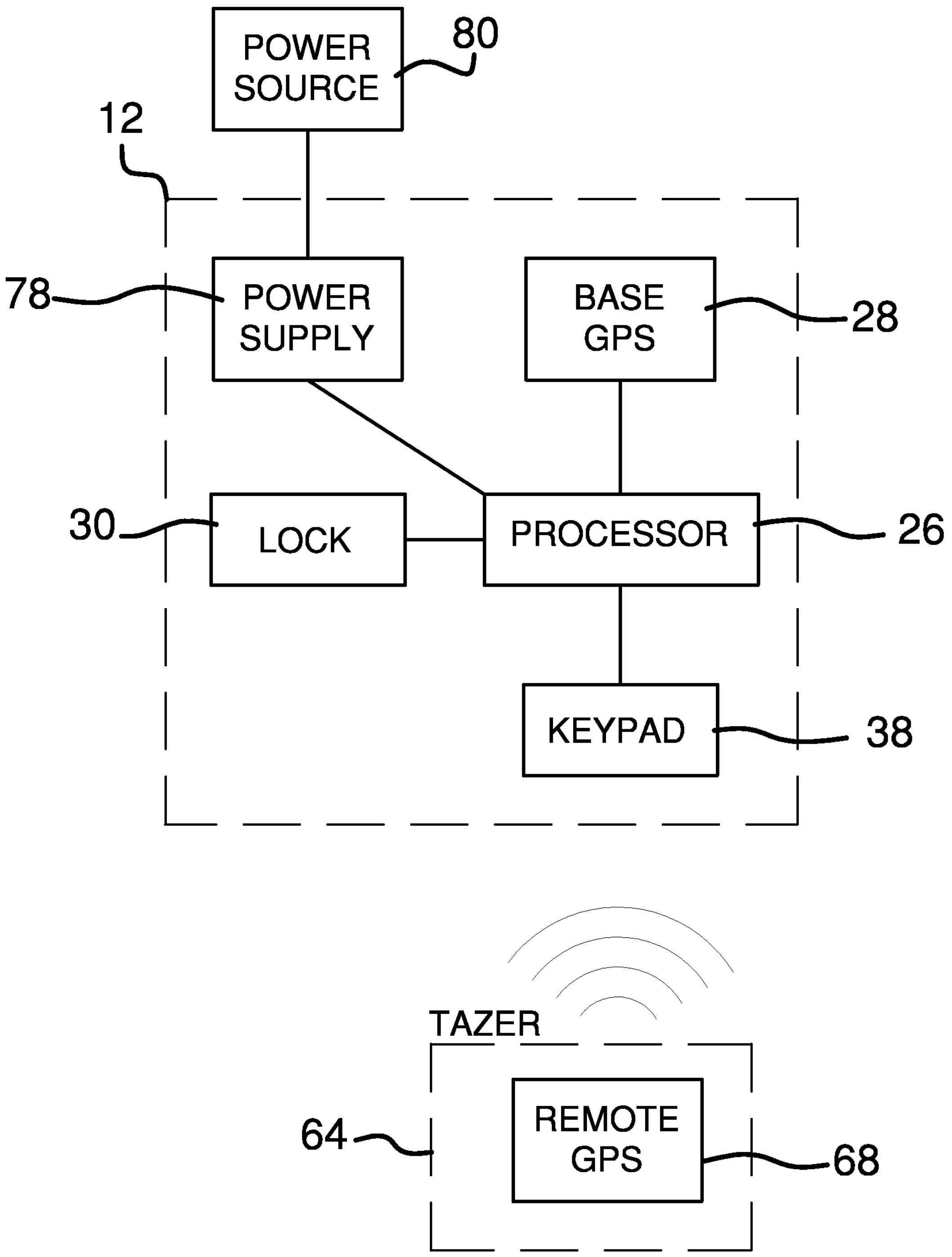
FIG. 7 is a schematic view of an embodiment of the disclosure.

With reference now to the drawings, and in particular to FIGS. 1 through 7 thereof, a new storage device embodying the principles and concepts of an embodiment of the disclosure and generally designated by the reference numeral 10 will be described.

As best illustrated in FIGS. 1 through 7, the weapon storage assembly 10 generally comprises a housing 12. A front side 14 of an outer wall 16 of the housing 12 is open to access an interior of the housing 12. The housing 12 is coupled to a vertical support surface 18. The front side 14 of the outer wall 16 of the housing 12 is flush with the vertical support surface 18. Additionally, the vertical support surface 18 may be a wall in a public building 19 such as a school, hospital or other similar public building 19.

A door 20 is provided. A first lateral side 22 of the door 20 is hingedly coupled to a first oblique side 24 of the outer wall 16 of the housing 12. A processor 26 is coupled to the housing 12. The processor 26 may be an electronic processor of any conventional design. A base GPS 28 is coupled to the housing 12. The base GPS 28 is electrically coupled to the processor 26. The base GPS 28 may be a GPS of any conventional design.

A transceiver 94 is coupled to the housing 12. The transceiver 94 is electrically coupled to the processor 26. The transceiver may be an RF transceiver of any conventional design. Continuing, the transceiver 94 is in electromagnetic communication with a telephone network and the internet. The transceiver 94 contacts police or other emergency responders through the telephone network. The transceiver 94 sends email alerts throughout the public building through the internet.

A lock 30 is coupled to a rear surface 32 of the door 20. The lock 30 is positioned proximate a second lateral side 34 of the door 20. The lock 30 engages a second oblique side 36 of the outer wall 16 of the housing 12 when the door 20 is positioned in a closed position. The lock 30 is electrically coupled to the processor 26.

A keypad 38 is coupled to a front surface 39 of the door 20. The keypad 38 has a plurality of actuators 40 coupled to a forward surface 42 of the keypad 38. A user 44 may engage the plurality of actuators 40. The plurality of actuators 40 comprise a plurality of number actuators 46 and an enter actuator 48. The keypad 38 is electrically coupled to the processor 26. The user 44 enters an unlock code with the plurality of number actuators 46. The keypad 38 opens the lock 30 after the user 44 enters the unlock code.

A tazer peg 50 is coupled to an inside surface 52 of the second oblique side 36 of the outer wall 16 of the housing 12. The tazer peg 50 extends toward the first oblique side 24 of the outer wall 16 of the housing 12. A handcuff peg 56 is coupled to the inside surface 52 of a back side 58 of the outer wall 16 of the housing 12. The handcuff peg 56 extends toward the front side 14 of the outer wall 16 of the housing 12.

A light emitter 60 is coupled to the front surface 39 of the door 20. The light emitter 60 is electrically coupled to the processor 26. The light emitter 60 emits light when the user 44 enters the unlock code into the keypad 38. The light emitter 60 may be an LED of any conventional design.

A speaker 62 is coupled to the front surface 39 of the door 20. The speaker 62 is electrically coupled to the processor 26. The speaker 62 emits an audible alarm when the user 44 enters the unlock code into the keypad 38. The speaker 62 may be an audio speaker of any conventional design.

A door switch 92 is coupled to the housing 12. The door switch 92 is engaged by the door 20 when the door 20 is closed. The door switch 92 triggers the transceiver 94 to send a silent alarm to nearby police or other emergency responder when the door is opened. Additionally, the door switch 92 triggers the transceiver 94 to send the email alerts.

A tazer 64 is positioned on the tazer peg 50. A handle 66 of the tazer 64 is directed toward the front side 14 of the outer wall 16 of the housing 12 so the user 44 may easily grab and deploy the tazer 64. The tazer 64 is used to subdue an assailant 65. Additionally, the tazer 64 may be a tazer 64 of any conventional design that has an operational voltage of approximately 50,000 VDC.

A remote GPS 68 is electrically coupled to the tazer 64. The remote GPS 68 is in electromagnetic communication with the base GPS 28. The remote GPS 68 disables the tazer 64 if the tazer 64 is forcibly removed from the housing 12 without the unlock code being entered into the keypad 38. Additionally, the remote GPS 68 allows the tazer 64 to be located if the tazer 64 is forcibly removed from the housing 12.

A pair of handcuffs 70 is positioned on the handcuff peg 56. The user 44 places the pair of handcuffs 70 on the assailant 65 after the user 44 subdues the assailant 65 with the tazer 64. The pair of handcuffs 70 may be handcuffs of any conventional design.

The front surface 39 of the door 20 has a handle well 72 extending well extending rearwardly therein. The handle well 72 is positioned between the keypad 38 and the second oblique side 36 of the door 20. A handle 76 is positioned within the handle well 72. The handle 76 may be gripped by the 44 user to open the door 20.

A power supply 78 is coupled to the housing 12. The power supply 78 is electrically coupled to the processor 26. The power supply 78 is electrically coupled to a power source 80. The power source 80 may be an electrical system of the public building. Additionally, the power supply 78 may comprise at least one battery 96. The battery 96 provides power in the event of a loss of power Alternatively, a card reader 82 is coupled to the front surface 39 of the door 20. The card reader 82 is electrically coupled to the processor 26. The user 44 swipes a card 84 through the card reader 82 to unlock the door 20. The card reader 82 may be an electromagnetic card reader of any conventional design.

Continuing in the alternative embodiment, a thumb reader 86 is coupled to the front surface 39 of the door 20. The thumb reader 86 is electrically coupled to the processor 26. The user 44 places the user's thumb on the thumb reader 86 to open the door 20. The thumb reader 86 may be fingerprint reader of any conventional design.

Alternatively, a retinal scanner 90 is coupled to the front surface 39 of the door 20. The retinal scanner 90 is electrically coupled to the processor 26. The retinal scanner 88 identifies the user's retina to open the door 20. The retinal scanner 90 may be an optical retinal scanner of any conventional design.

In use, a plurality of the assemblies 10 are located throughout the public building 19. The plurality of assemblies 10 are in electromagnetic communication with each other. The user 44 approaches a nearby assembly 10 and enters the unlock code into the keypad 38 when the user 44 observes the assailant 65 in the public building 19. The user 44 opens the door 20 to retrieve the tazer 64 from the housing 12. The user 44 employs the tazer 64 to subdue the assailant 65. The plurality of assemblies 10 all emit the audible alarm when the code is entered into the keypad 38 on the nearby assembly 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A weapon storage assembly configured to store a weapon in a public area wherein said assembly is accessible by an authorized user, said assembly comprising:

a housing configured to be coupled to a vertical support surface, said housing having an outer wall, a front side of said outer wall of said housing being open to access an interior of said housing, said housing being coupled to the vertical support surface such that said front side of said outer wall of said housing is flush with the vertical support surface;

a door, a first lateral side of said door being hingedly coupled to a first oblique side of said outer wall of said housing;

a processor coupled to said housing;

a lock coupled to a rear surface of said door, said lock being operationally coupled to said processor, said lock engaging a second oblique side of said outer wall of said housing such that said door is retained in a closed position;

a keypad coupled to a front surface of said door, said keypad being operationally coupled to said processor, the authorized user engaging said keypad to enter an unlock code such that said keypad unlocks said lock;

said weapon positioned within said housing wherein said weapon is accessible after said door is opened;

a taser peg coupled to an inside surface of said second oblique side of said outer wall of said housing such that said taser peg extends toward said first oblique side of said outer wall of said housing;

said front surface of said door having a handle well extending rearwardly therein, said handle well being positioned between said keypad and a second lateral side of said door;

a base GPS coupled to said housing; and said base GPS being electrically coupled to said processor.

2. The assembly according to claim 1, wherein said lock is positioned proximate said second lateral side of said door such that said lock engages said second oblique side of said outer wall of said housing when said door is retained in the closed position, said lock being electrically coupled to said processor.

3. The assembly according to claim 1, wherein said keypad includes a plurality of actuators coupled to a forward surface of said keypad such that the authorized user may engage said plurality of actuators to enter said unlock code.

4. The assembly according to claim 3, wherein said keypad is electrically coupled to said processor.

5. The assembly according to claim 1, wherein said weapon is a taser and is positioned on said taser peg such that a handle of said taser is directed toward said front side of said outer wall of said housing such that said taser is positioned to be grabbed and deployed.

6. The assembly according to claim 5, wherein a remote GPS is coupled to said taser; said remote GPS being in electromagnetic communication with said base GPS; said remote GPS disabling said taser if said taser is forcibly removed from said housing without said unlock code being entered into said keypad.

7. The assembly according to claim 1, wherein a handle is positioned within said handle well such that said handle is configured to be gripped by the authorized user to open said door.

8. The assembly according to claim 1, wherein a light emitter is coupled to said front surface of said door; and said light emitter being electrically coupled to said processor such that said light emitter emits light when the authorized user enters said unlock code into said keypad.

9. The assembly according to claim 1, wherein a speaker is coupled to said front surface of said door; and said speaker being electrically coupled to said processor such that said speaker emits an audible alarm when the authorized user enters said unlock code into said keypad.

10. The assembly according to claim 1, wherein a power supply is coupled to said housing; said power supply being electrically coupled to said processor; and said power supply being electrically coupled to a power source.

11. A weapon storage assembly configured to store a weapon in a public area wherein said assembly is accessible by an authorized user, said assembly comprising:

a housing, said housing having an outer wall, a front side of said outer wall of said housing being open to access an interior of said housing, said housing being coupled to a vertical support surface such that said front side of said outer wall of said housing is flush with the vertical support surface;

a door, a first lateral side of said door being hingedly coupled to a first oblique side of said outer wall of said housing;

a processor coupled to said housing;

a base GPS coupled to said housing, said base GPS being electrically coupled to said processor;

a lock coupled to a rear surface of said door, said lock being positioned proximate a second lateral side of said door such that said lock engages a second oblique side of said outer wall of said housing when said door is positioned in a closed position, said lock being electrically coupled to said processor;

a keypad coupled to a front surface of said door, said keypad having a plurality of actuators coupled to a forward surface of said keypad such that each of said plurality of actuators is configured to be engaged by the authorized user, said keypad being electrically coupled to said processor;

a taser peg coupled to an inside surface of said second oblique side of said outer wall of said housing such that said taser peg extends toward said first oblique side of said outer wall of said housing;

a light emitter coupled to said front surface of said door, said light emitter being electrically coupled to said processor such that said light emitter emits light when the authorized user enters an unlock code into said keypad;

a speaker coupled to said front surface of said door, said speaker being electrically coupled to said processor such that said speaker emits an audible alarm when the authorized user enters said unlock code into said keypad;

a taser positioned on said taser peg having a handle of said taser being directed toward said front side of said outer wall of said housing such that said taser is configured to be grabbed and deployed;

a remote GPS coupled to said taser, said remote GPS being in electromagnetic communication with said base GPS, said remote GPS disabling said taser when said taser is forcibly removed from said housing without said unlock code being entered into said keypad;

said front surface of said door having a handle well extending rearwardly therein, said handle well being positioned between said keypad and a second lateral side of said door;

a handle positioned within said handle well such that said handle is configured to be gripped by the authorized user to open said door; and a power supply coupled to said housing, said power supply being electrically coupled to said processor, said power supply being electrically coupled to a power source.

* * * * *